US012616916B1

(12) United States Patent
Stewart

(10) Patent No.: US 12,616,916 B1
(45) Date of Patent: May 5, 2026

(54) APPARATUSES, SYSTEMS AND METHODS FOR DRAINING AN AIR MOISTURE SEPARATOR

(71) Applicant: Advanced Cleanup Technologies Inc., New York, NY (US)

(72) Inventor: Jason Stewart, New York, NY (US)

( * ) Notice: Subject to any disclaimer, the term of this patent is extended or adjusted under 35 U.S.C. 154(b) by 130 days.

(21) Appl. No.: 18/205,452

(22) Filed: Jun. 2, 2023

Related U.S. Application Data

(60) Provisional application No. 63/348,499, filed on Jun. 3, 2022, provisional application No. 63/348,067, filed on Jun. 2, 2022.

(51) Int. Cl.
 *B01D 5/00* (2006.01)
 *B09C 1/00* (2006.01)
(52) U.S. Cl.
 CPC ........... *B01D 5/0051* (2013.01); *B01D 5/009* (2013.01); *B09C 1/005* (2013.01)
(58) Field of Classification Search
 CPC ...... B01D 5/0051; B01D 5/009; B09C 1/005; G05D 22/00; G05D 22/02
 See application file for complete search history.

(56) References Cited

U.S. PATENT DOCUMENTS

| | | | | |
|---|---|---|---|---|
| 9,242,065 B2 * | 1/2016 | Hunt et al. | ........... | B01D 53/266 |
| 2018/0290103 A1 * | 10/2018 | Choi et al. | ........... | B01D 53/265 |
| 2019/0127253 A1 * | 5/2019 | Thomas et al. | ........ | B01D 5/009 |
| 2023/0285904 A1 * | 9/2023 | Tateoka et al. | ........ | B01D 61/22 |

FOREIGN PATENT DOCUMENTS

| | | | | |
|---|---|---|---|---|
| KR | 20150042649 A | * | 4/2015 | ........... B01D 53/228 |

OTHER PUBLICATIONS

KR 20150042649 A Translation (Year: 2015).*

* cited by examiner

*Primary Examiner* — Jerry-Daryl Fletcher
*Assistant Examiner* — Dario Antonio Deleon
(74) *Attorney, Agent, or Firm* — Holland & Knight LLP; Forrest S. Tinnin; Matthew C. Cox

(57) ABSTRACT

Systems, methods, and apparatuses to drain an air moisture separator are provided herein. A blower may be configured to draw air through the air moisture separator, such that moisture is separated from the air and collected within the air moisture separator. A valve may be configured to permit the moisture to exit the air moisture separator based on a pressure within the air moisture separator. A controller may be configured to deactivate the blower based on a first determination and activate the blower based on a second determination. The first determination and the second determination may be based on measurements detected by one or more sensors.

14 Claims, 15 Drawing Sheets

60

First Sensor 52

Second Sensor 54

First measurement signal(s) 62

Second measurement signal(s) 64

Controller 50

Control Signal(s) 66

Blower 22

90

200

30

APPARATUSES, SYSTEMS AND METHODS FOR DRAINING AN AIR MOISTURE SEPARATOR

CROSS-REFERENCES TO RELATED APPLICATIONS

This application is a non-provisional of and claims priority to and benefit of U.S. Patent Application No. 63/348,067 filed Jun. 2, 2022; and U.S. Patent Application No. 63/348,499 filed Jun. 3, 2022, each of which are incorporated by reference in their entireties.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO SEQUENCE LISTING OR COMPUTER PROGRAM LISTING INDEX

Not applicable.

BACKGROUND

The present invention relates generally to environmental remediation and mitigation. More particularly, the present disclosure pertains to draining air moisture separators within remedial systems.

"Environmental remediation" refers to the removal of pollution or contaminants from soil, groundwater, sediment, or surface water. For example, remediation is often required for soil beneath infrastructural systems such as buildings, roads, and so on. In many instances, routine remediation is required in order for such infrastructural systems to retain compliance with various governmental standards. As applied to remediation of soil beneath such infrastructural systems, as well as groundwater remediation and soil vapor mitigation, air is typically drawn (e.g., extracted) from the soil. Typically, a blower or compressor is used to draw the air from the soil. The air may carry entrained water and/or other contaminants (moisture) and thus, prior to removal of such moisture, may be considered "moisturized air." In turn, the moisturized air may be drawn through an air moisture separator, which removes the moisture for disposal. Accordingly, the blower or compressor ejects dehydrated air (e.g., air with the moisture removed via the separator device).

Typically, such remediation systems require periodic intervention in order to maintain proper function. For example, and as suggested above, moisture is typically collected within the air moisture separator. Accordingly, the air moisture separator must be drained periodically in order to provide room for oncoming moisture. Conventional systems often require manual operation in order to accomplish such drainage, and thus present numerous issues associated with labor, cost, and inefficiency. Moreover, during drainage and other circumstances associated with operation of such remediation systems, operation of the blower is unnecessary. For instance, when the moisture collected within the air moisture separator accumulates to a degree that requires drainage, operation of the blower is unnecessary and, in some cases, persistent operation of the blower in such circumstances can cause damage to the blower. Deactivation of the blower is typically accomplished manually, or not done at all. Cases of manual deactivation of the blower present issues associated with labor, cost, and cases of failure to deactivate the blower present issues associated with cost, inefficiency, and damage to the blower. It would be advantageous to automatically drain the separator and, in some cases, deactivate the blower based on the varying conditions experienced by the remediation system.

What is needed, therefore, are improved systems, methods, and apparatuses for draining air moisture separators within environmental remediation systems.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some aspects of the present disclosure provide an apparatus for draining an air moisture separator. The apparatus may include a blower fluidly coupled to the air moisture separator and configured to draw air through the air moisture separator when the blower is activated, such that moisture is separated from the air and collected within the moisture separator. The apparatus may further include a valve connected to the air moisture separator. The valve may be configured to selectively permit the moisture to exit the air moisture separator based on an amount of moisture collected within the air moisture separator. The apparatus may further include a one or more sensors and a controller. The controller may be configured to make one or more determinations based on measurements detected by the sensors, deactivate the blower based on such determinations, and activate the blower based on other determinations.

Other aspects of the present disclosure provide a system for draining an air moisture separator. The system may include the apparatus for draining an air moisture separator. The system may further include a remote device in communication with the controller. The controller may be configured to transmit a first status signal to the remote device. The first status signal may indicate whether the blower has been activated or deactivated. The remote device may be configured to generate, for display, a first indication based on the first status signal.

In some embodiments of the present disclosure, the controller is further configured to transmit a second status signal to the remote device. The remote device may be further configured to generate, for display, a second indication based on the second status signal. The second status signal may indicate an amount of moisture within the air moisture separator.

In some embodiments of the present disclosure, the system may further include a server. The controller may be further configured to wirelessly transmit the status signals to the server, which may store the status signals. The remote device may be further configured to transmit a status request to the server. The server may be further configured to, in response to the status request, transmit the stored status signals to the remote device. The remote device may be further configured to present, for display, indications based on the stored status signals.

Other aspects of the present disclosure provide a method for draining an air moisture separator. The method may include providing a blower fluidly coupled to the air moisture separator, a drain configured to receive moisture from the air moisture separator, and a valve disposed between the air moisture separator and the drain. The method may further include activating the blower, such that the blower draws air through the air moisture separator, the air moisture separator removes the moisture from the air, and the moisture is collected within the air moisture separator. The method may further include permitting, via the valve, the moisture to exit the separator based on an amount of moisture collected within the separator. The method may further include deactivating, via a controller, the blower for a threshold period of time based on one or more measurements detected by one or more sensors. The method may further include activating, via the controller, the blower based on determinations made by the controller.

Numerous other objects, advantages and features of the present disclosure will be readily apparent to those of skill in the art upon a review of the following drawings and description of a preferred embodiment.

DETAILED DESCRIPTION

Figure 1:
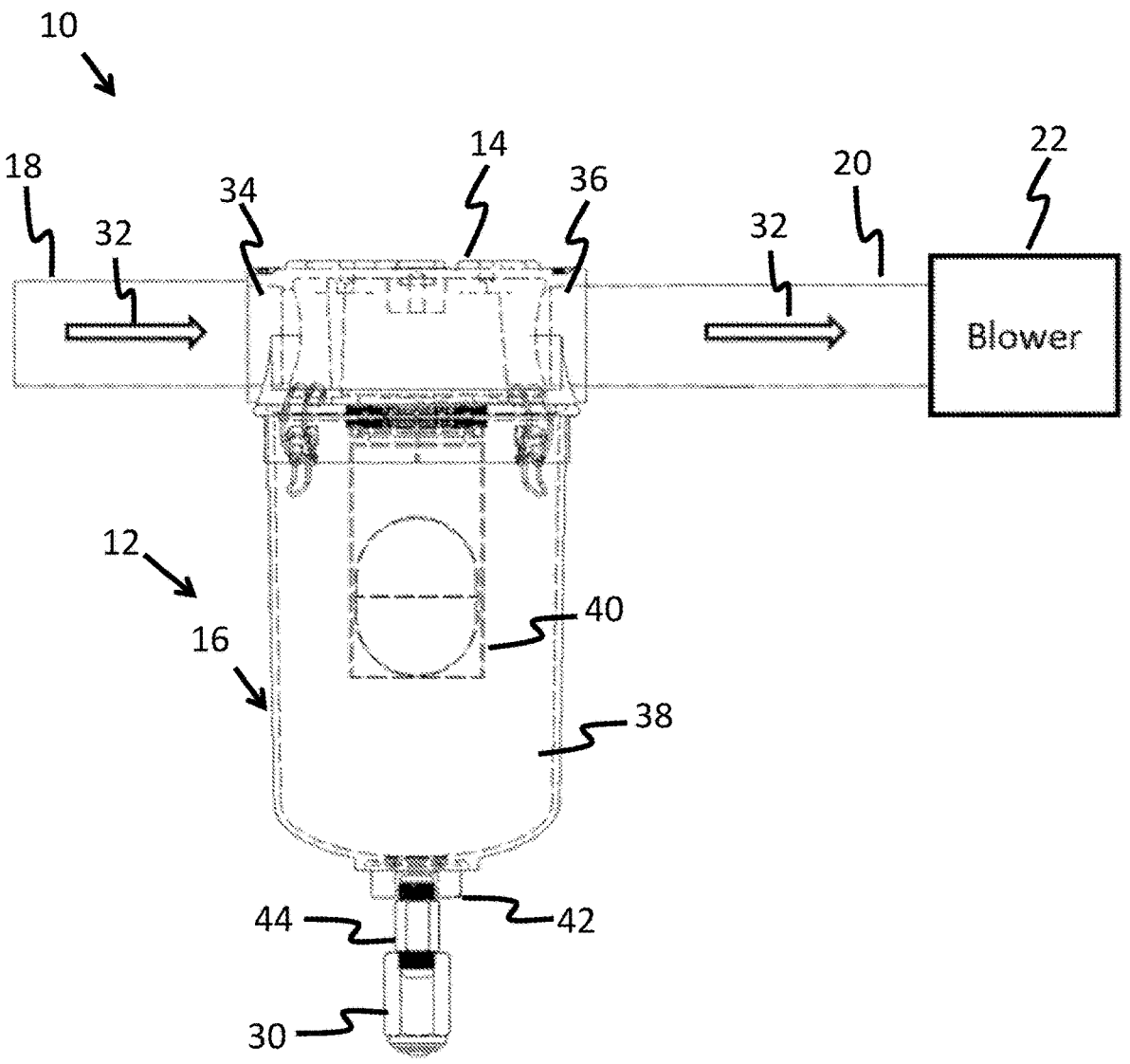
FIG. 1 is a schematic view of an apparatus for draining an air moisture separator via a blower, according to some embodiments of the present disclosure.

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatuses, systems, and methods described herein. Such equivalents are considered to be within the scope of this disclosure and may be covered by the claims.

Furthermore, the described features, structures, or characteristics of the disclosure may be combined in any suitable manner in one or more embodiments. In the description contained herein, numerous specific details are provided, such as examples of programming, software, user selections, hardware, hardware circuits, hardware chips, or the like, to provide understanding of embodiments of the disclosure. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

The aforementioned features and advantages of the embodiments will become more fully apparent from the description and appended claims, or may be learned by the practice of embodiments as set forth herein. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the present disclosure may take the form of a computer program product embodied in one or more computer-readable media having program code embodied thereon.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Referring generally to the Figures, an apparatus 10 for draining an air moisture separator (separator) 12 is provided, according to various embodiments of the present disclosure. For example, the apparatus 10 may include an air blower or compressor, such as a blower 22, as well as a separator 12. The separator 12 is depicted in further detail with reference to FIG. The blower 22 may be fluidly coupled to the separator 12 and configured to draw air through the separator 12 when the blower 22 is activated. In other words, the blower 22 may be operated to draw moisturized air from pores in the ground below an infrastructural system, such as a building, road, etc. Such moisturized air may carry entrained water and/or other contaminants (moisture). In turn, the moisturized air may be drawn, by the blower 22, through the separator 12, where the moisture is separated from the moisturized air and collected (e.g., accumulated) within the separator 12. Accordingly, dehydrated air (e.g., air with the moisture removed via the separator 12) may be drawn from the separator 12 to the blower 22. By drawing the moisturized air from pores in the ground below such infrastructural systems, the apparatus 10 may enhance the structural and environmental integrity of such infrastructural systems, and/or maintain compliance with various structural and environmental standards pertaining to such infrastructural systems. In this sense, the present disclosure may provide the apparatus 10 as a remediation system, or forming part of a remediation system.

Figure 15:
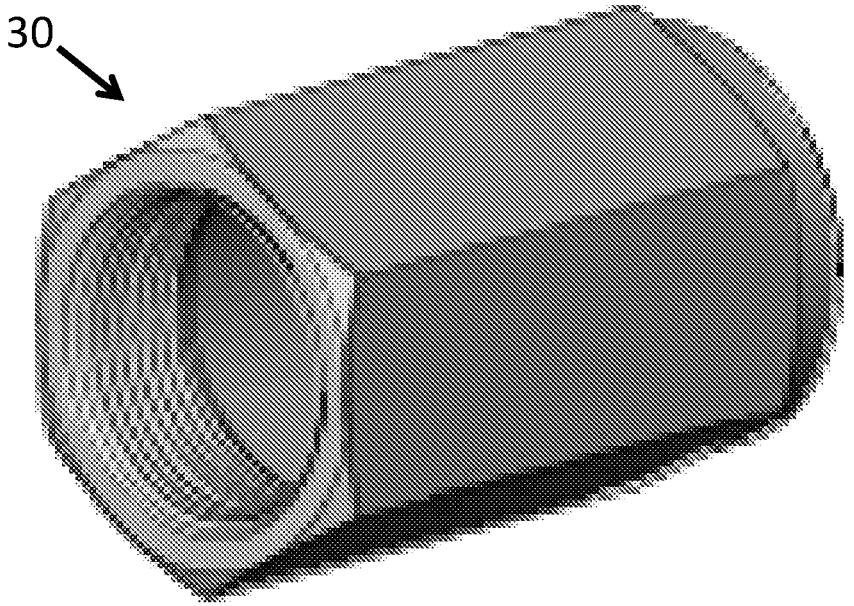
FIG. 15 is a perspective view of a valve for an air moisture separator, according to some embodiments of the present disclosure.

As suggested above, as the apparatus 10 operates to draw the moisturized air through the separator 12, moisture may be collected within the separator 12. The apparatus 10 may further include a valve that is operable to permit the moisture to exit from the separator 12 For example, The apparatus 10 may further include a valve 30 disposed between the separator 12 and the drain 24. The valve 30 is depicted in greater detail with reference to FIG. 15. The valve 30 may be configured to permit the moisture to exit the separator 12 based on a pressure within the separator 12. In some embodiments, the valve 30 may be a check valve that is configured to drain the separator 12, and change flow conditions (e.g., allow drainage or not allow drainage) based upon pressure applied to the valve 30. In other embodiments, the valve 30 is a solenoid valve that is configured to permit the moisture to exit the separator 12 based on a detected pressure within the separator 12, as discussed in greater detail below. Changing the operating state of the blower 22 either manually or remotely may change the pressure within the separator 12 (e.g., the pressure applied to the valve 30), thus causing the separator 12 to drain. In some embodiments, the apparatus 10 includes a drain 24, which may be configured to receive the moisture from the separator 12 when the moisture is permitted to exit the separator 12 via the valve 30.

In some embodiments, the present disclosure provides apparatuses, systems, and methods for remotely operating a blower or compressor, such as the blower 22, based upon system conditions. For example, the apparatus 10 may include sensors and external devices such as a controller 50, a server 100, and a remote device 110 with a user interface 116. Based on the measurements detected by such sensors that are transmitted to the controller 50 or other external devices, the operating state of the blower 22 may be changed. Accordingly, the present disclosure may provide a system to remotely change the operating state of the blower 22 based upon system conditions measured by the sensors.

Referring to FIG. 1, the apparatus 10 is shown, according to some embodiments of the present disclosure. In some embodiments, the apparatus 10 includes the separator 12, an inlet line 18, an outlet line 20, the blower 22, and the valve 30.

In some embodiments, the blower 22 is fluidly coupled to the separator 12 via the outlet line 20. The blower 22 may be operable to form a pressure vacuum (e.g., apply a negative pressure) in the outlet line 20, such that moisturized air is drawn from the inlet line 18 in a direction 32. As discussed above, such moisturized air may carry moisture. The moisturized air may be drawn through the separator 12 (where the moisture is removed from the moisturized air), and dehydrated air (e.g., air with the moisture removed via the separator 12) is drawn from the separator 12 through the outlet line 20 in the direction 32. For example, when moisturized air is drawn through the separator 12 via the inlet line 18, moisture of the moisturized air may be separated from the moisturized air and collected in the separator 12, such that dehydrated air is provided to the outline line 20. Depending on the implementation of the present disclosure, the blower 22 may be configured to apply the aforementioned negative pressure at a magnitude of at least ten inches water column.

In some embodiments, the separator 12 includes a cap 14 secured to a housing 16. The cap 14 may include an inlet opening (e.g., an inlet port) 34 formed in one side of the cap 14 to permit the moisturized air to enter the separator 12 via the inlet line 18. The cap 14 may further include an outlet opening (e.g., an outlet port) 36 formed in an opposite side of the cap 14 to permit the dehydrated air to pass from the separator 12 via the outlet line 20. The housing 16 may include an interior 38 in fluid communication with the inlet opening 34, and a conduit 40 disposed within the interior 38. The conduit 40, in turn, may be in fluid communication with the outlet opening 36.

As mentioned above, when moisturized air is drawn through the separator 12 via the inlet line 18 (by the blower 22), moisture of the moisturized air may be separated from the moisturized air and collected in separator 12, such that dehydrated air is provided to the outline line 20. In particular, moisturized air may be drawn from the inlet line 18 into the cap 14 via the inlet opening 34 and into the interior 38 of the housing 16. In turn, air may be drawn from the interior 38, through the conduit 40, and to the outlet opening 36 of the cap 14. The conduit 40 may be configured such that only dehydrated air is permitted to pass from the interior 38 into the conduit 40, and thus the moisture of the moisturized air may be separated from the air and collected in the interior 38. Accordingly, dehydrated air may be drawn from the conduit 40 to the outlet opening 36 of the cap 14, and through the outlet line 20 towards the blower 22. As described in greater detail below, the moisture collected within the separator 12 may be released via a relief opening 42 on the housing 16.

As mentioned above, the apparatus 10 may include the drain 24. In some embodiments, the drain 24 is connected to the interior 38 of the housing 16 on the separator 12 via a check valve (e.g., a relief valve) 30. As a first example, the relief opening 42 on the housing 16 may be directly connected to the valve 30. As a second example, the relief opening 42 on the housing 16 may be connected to the valve 30 via a relief line 44, as shown. As the moisture collected within the separator 12 accumulates, pressure on the valve 30 may rise. In some embodiments, the valve 30 is configured to allow the moisture to flow from the relief opening 42 to the drain 24 when the accumulation of moisture results in the application of a threshold pressure on the valve 30. In other words, the valve 30 may be operable as a passive valve that opens in response to application of a threshold pressure. Of course, so long as the accumulation of moisture does not result in the application of the threshold pressure on the valve 30, the moisture may remain in the interior 38. In other embodiments, the apparatus 10 does not include the drain, and the valve 30 simply allows permits the moisture to exit the separator 12 and flow into the surrounding environment of the apparatus 10.

As mentioned above, changing the operating state (e.g., activation or deactivation) of the blower 22 either manually or remotely may change the pressure applied to the valve 30, thus causing the separator 12 to drain. For example, when the blower 22 is activated, the blower 22 may draw a standard volumetric amount of air from the outlet line 20. Conversely, when the blower 22 is deactivated, the blower 22 does not operate to draw air from the outlet line 20. As described in greater detail herein, the blower 22 may be activated or deactivated in order to facilitate improved operation of the separator 12.

As a first example of selective operation of the blower 22, when the amount of moisture accumulated within the separator 12 reaches a pre-determined amount, the blower 22 may be deactivated, thereby allowing the blower 22 to idle while the valve 30 is allowed to drain the moisture from the interior 38. For instance, and as mentioned above, as moisture accumulates within the separator 12, the pressure applied to the valve 30 may increase to a threshold pressure at which the valve 30 permits the moisture to travel from the separator 12 (via the relief opening 42) to the drain 24 (in other cases, such as where the valve 30 is a solenoid valve, the valve 30 may be operated automatically based on measurements from sensors that determine an amount of moisture within the separator 12). In various instances, the continuous operation of the blower 22 may result in accumulation of moisture within the separator 12, such that the pressure applied to the valve 30 is substantially above the threshold pressure. In this sense, the continuous operation of the blower 22 may "outpace" the passive operation of the valve 30.

Advantageously, the blower 22 may be deactivated for a threshold period of time while the valve 30 permits the moisture to travel from the separator 12 to the drain 24. In some embodiments, the threshold period of time is fifteen minutes. In other embodiments, the threshold period of time is longer than fifteen minutes (thirty minutes, an hour, multiple hours, etc.). In other embodiments still, the threshold period of time is less than fifteen minutes (ten minutes, five minutes, etc.). In other cases, the blower 22 may be deactivated until it is determined (via sensors) that the amount of moisture within the separator 12 has returned to a lower level. In turn, once the threshold period of time has elapsed, the blower 22 may be activated in order to resume drawing moisturized air into the separator 12 and resume collection of the moisture within the separator 12. As a first exemplary benefit, such selective operation of the blower 22 may improve the energy efficiency of the apparatus 10 by reducing the long-term power consumption of the blower 22. As a second exemplary benefit, such selective operation of the blower 22 may prevent the moisture from accumulating within the separator 12 to a degree that causes the blower 22 to receive a substantial amount of moisture, which is known to cause a damage to blowers or compressors in conventional systems. As a third exemplary benefit, such selective operation of the blower 22 may prevent the conduit 40 from being submerged within moisture that is accumulated within the interior 38, which is known to reduce the efficacy of separators in conventional systems. For instance, the conduit 40 may include a float level (e.g., a metal ball), that rises and closes the outlet opening 36 of the cap 14, which may cause the blower 22 to be "choked," as discussed in greater detail below.

As a second example of selective operation of the blower 22, when the blower 22 is "choked," the blower 22 may advantageously be deactivated. For instance, the conduit 40 may include a float level that rises with the accumulation of moisture within the separator 12. When the float level rises to a threshold height, the conduit 40 may close (e.g., cut off) the outlet opening 36. When the outlet opening 36 is closed by the conduit 40, the blower 22 maybe choked in the sense that a magnitude of the pressure vacuum created by the blower 22 (in the outlet line 20, for example) may be escalated above a certain level. Furthermore, as mentioned above, the blower 22 may be operated to draw moisturized air from pores in the ground below an infrastructural system. As moisturized air is drawn frum such pores, a water (or other fluid) level below the infrastructural system may rise. In some cases, at a point where the water level rises to an extent that the fluid drawn from such pores is substantially water, the blower 22 may be "choked" as discussed above, and the blower 22 may advantageously be deactivated.

Figure 2:
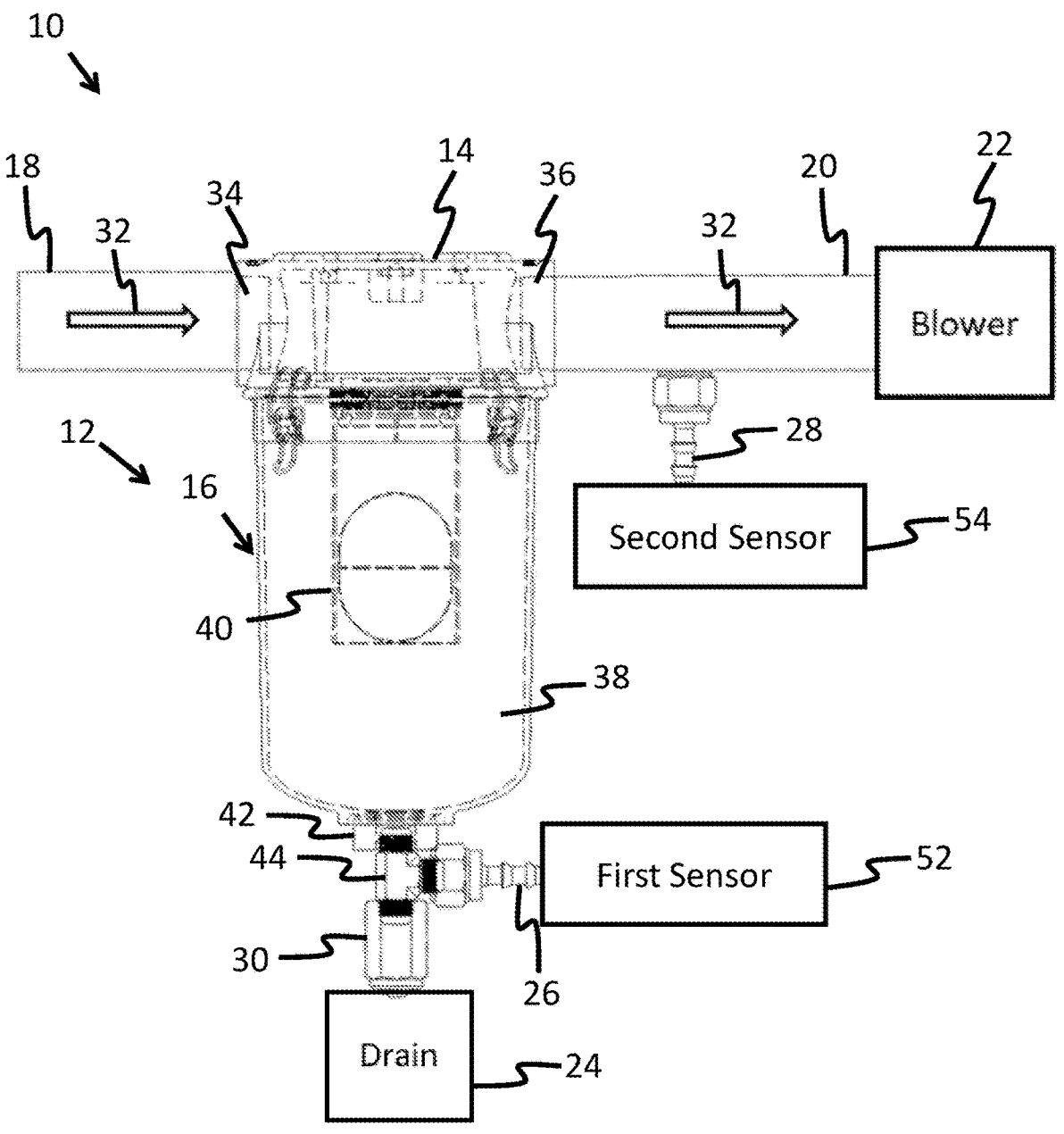
FIG. 2 is a schematic view of the apparatus of FIG. 1, where the apparatus includes a first sensor and a second sensor, according to some embodiments of the present disclosure.

Referring now to FIG. 2, the apparatus 10 may further include a first sensor 52 and a second sensor 54, according to some embodiments of the present disclosure. Although discussed herein as including each of the first and second sensors 52, 54, it should be appreciated that in further embodiments, the apparatus 10 includes only the first sensor 52, and in further embodiments still, the apparatus 10 includes only the second sensor 54. As discussed in greater detail below, the first and second sensors 52, 54 may be configured to determine a status of the separator 12 (and, thus, an operational status of the apparatus 10 in its entirety), thus allowing for selective operation of the blower 22 in order to optimize the performance of the apparatus 10. For example, the first and second sensors 52, 54 may be configured to measure the amount of moisture within the separator 12.

In some embodiments, the first sensor 52 is a pressure sensor and is configured to measure a pressure within the separator 12. In particular, the pressure within the separator 12 may be equivalent to the pressure applied by the moisture on the valve 30 (or, generally, applied by the air or fluid within the interior 38 on the valve 30) as the moisture is accumulated within the interior 38 of the housing 16 on the separator 12. The second sensor 52 may also be a pressure sensor that measures the pressure between the separator 12 and the blower 22 (e.g., within the outlet line 20). In this sense, the difference the measured pressure within the separator 12, and the pressure between the separator 12 and the blower 22, may be indicative of the amount of moisture accumulated within the separator 12. In order for the first sensor 52 to detect the pressure within the moisture separator 12, the first sensor 52 may be connected to a first port 26 disposed between the relief opening 42 and the valve 30. As shown, the first port 26 may be disposed on the relief line 44. Of course, the placement of the first sensor 52 as shown is exemplary and non-limiting in nature, as the first sensor 52 may be placed in any configuration that is amenable to measuring the pressure within the separator 12 (or, in particular, the pressure applied on the valve 30).

In other embodiments, the first sensor 52 is another type of sensor that is configured to provide the apparatuses, systems, and methods described herein. For example, the first sensor 52 may be a camera (configured to visually interpret the amount of moisture accumulated within the separator 12), a weight sensor (configured to determine, via a change in weight of the separator 12, the amount of moisture accumulated within the separator 12), a humidity sensor, a temperature sensor, and so on. In other embodiments still, the first sensor 52 is a high voltage switch and a float level. For example, as moisture accumulates within the separator 12, the float level may rise to a certain level, where the float level trips the high voltage switch. In this sense, the first sensor 52, when configured as a high voltage switch and float level, may similarly be configured to measure an amount of moisture collected within the separator 12.

In some embodiments, the second sensor 54 is a pressure sensor and is configured to measure a pressure between the separator 12 and the blower 22. Because the blower 22 is generating a negative pressure in order to draw air from the separator 12 to the blower 22, this pressure may be considered a pressure vacuum, the magnitude of which may be detected by the second sensor 54. In other words, the pressure between the separator 12 and the blower 22 may be equivalent to the pressure (which may be negative, and thus a pressure vacuum) of the air or fluid being received by the blower 22 (e.g., traveling between the outlet opening 36 and the blower 22). In order to detect the pressure between the separator 12 and the blower 22, the second sensor 54 may be connected to a second port 28 disposed between the outlet opening 36 and the blower 22. As shown, the second port 28 may be disposed on the outlet line 20. Of course, the placement of the second sensor 54 as shown is exemplary and non-limiting in nature, as the second sensor 54 may be placed in any configuration that is amenable to measuring the pressure between the separator 12 and the blower 22. As mentioned above, this measurement detected by the second sensor 54 may be used in combination with the measurement detected by the first sensor 52 in order to determine the amount of moisture within the separator 12. In other embodiments, the measurement detected by the second sensor 54 may be used independently to determine when the blower 22 is being "choked" as discussed above.

In other embodiments, the first sensor 52 is another type of sensor that is configured to provide the apparatuses, systems, and methods described herein. For example, the first sensor 52 may be a camera (configured to visually interpret the amount of moisture accumulated within the separator 12), a weight sensor (configured to determine, via a change in weight of the separator 12, the amount of moisture accumulated within the separator 12), a humidity sensor, a temperature sensor, and so on. In other embodiments still, the apparatus 10 may include additional sensors. Accordingly, the apparatus 10 may include the first and second sensors 52, 54, which may be pressure sensors, as well as such additional sensors configured to measure conditions such as visual imagery, weight, humidity, temperature, and so on.

The first and second sensors 52, 54 may be operable to facilitate the selective operation of the blower 22 as discussed above. As a first example, and as discussed above, when the amount of moisture accumulated within the separator 12 reaches a threshold amount, the blower 22 may be deactivated, thereby allowing the blower 22 to idle while the valve 30 is allowed to drain the moisture from the interior 38. As mentioned above, the difference between the pressure within the separator 12 (or, in particular, the pressure applied to the valve 30) and the pressure between the separator 12 and the blower 22 may be indicative of the amount of moisture accumulated within the separator 12. Thus, the first and second sensors 52, 54 may be operable to measure the amount of the moisture accumulated within the separator 12, such that a point at which the accumulation of the moisture reaches the aforementioned pre-determined amount may be identified, at which point the blower 22 may be temporarily deactivated in order to facilitate the associated advantages discussed above. As a second example, and as discussed above, when the blower 22 is "choked," the blower 22 may be deactivated. The blower 22 being choked may similarly be indicative of the amount of moisture accumulated within the separator 12. The second sensor 54 may be operable to determine when the blower 22 is choked as discussed above, at which point the blower 22 may be temporarily deactivated in order to facilitate the associated advantages discussed above.

Figure 3:
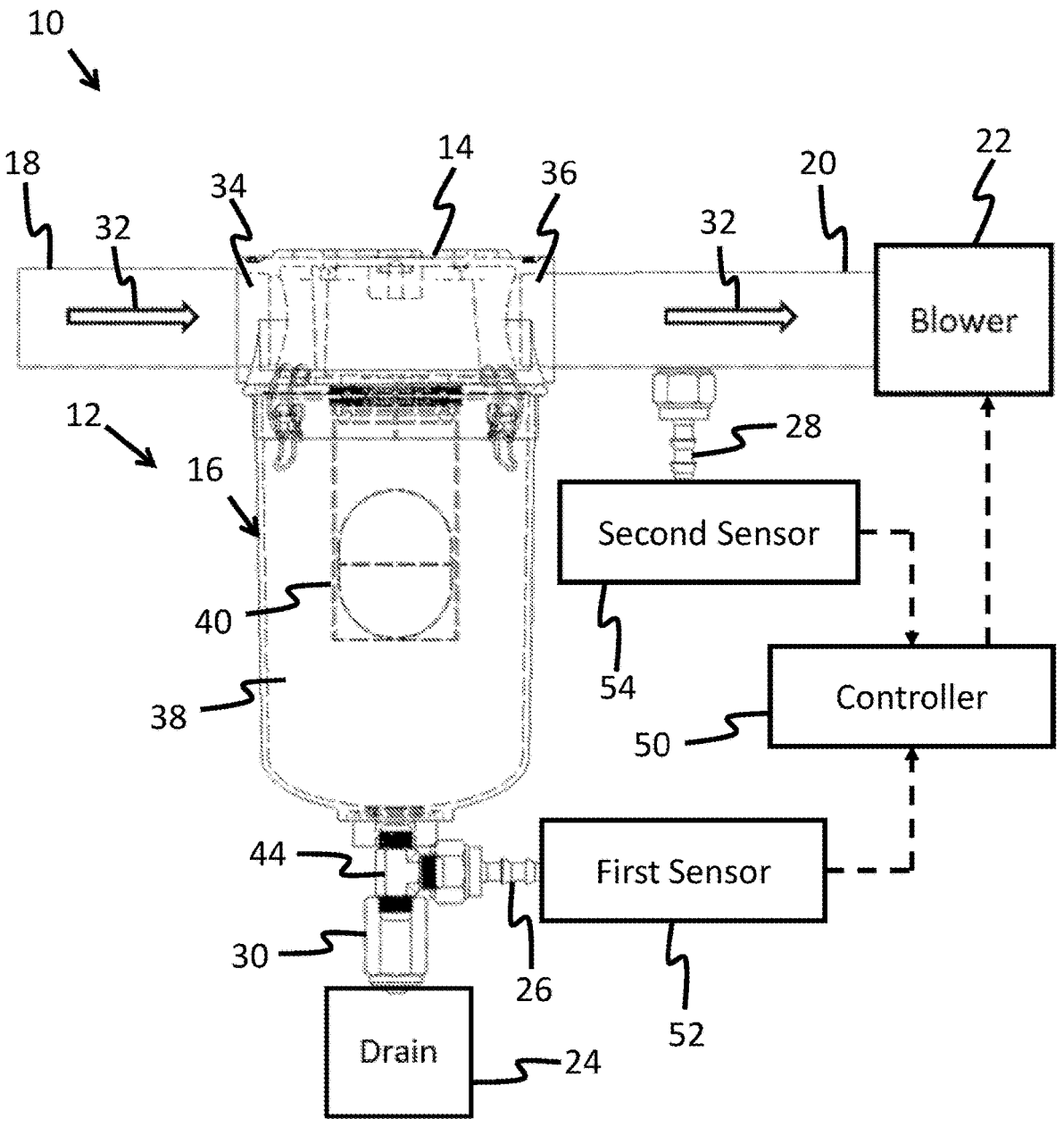
FIG. 3 is a schematic view of the apparatus of FIG. 2, where the apparatus further includes a controller in communication with the sensors and the blower, according to some embodiments of the present disclosure.
Figure 4:
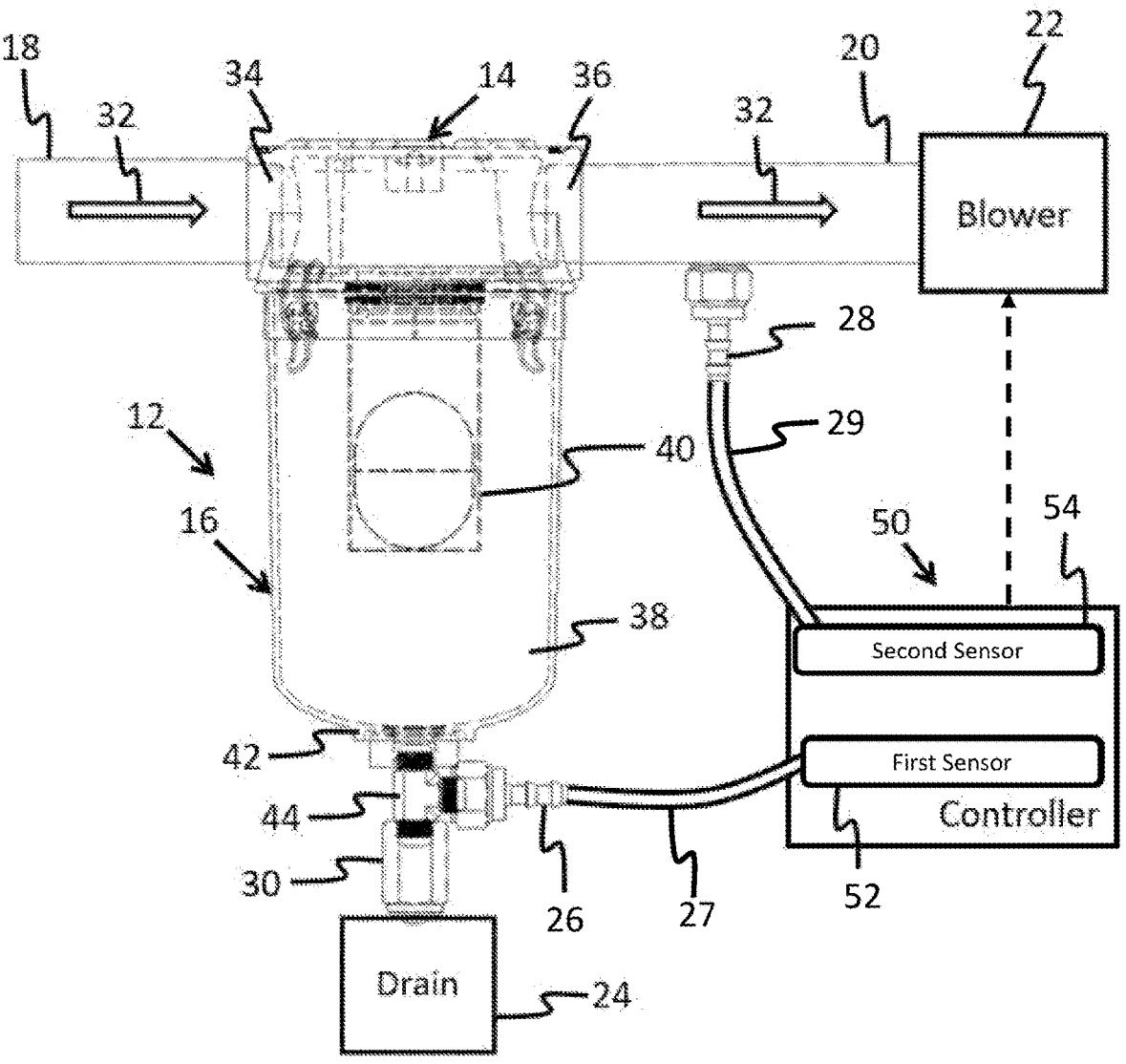
FIG. 4 is a schematic view of the apparatus of FIG. 2, where the apparatus further includes a controller in communication with the sensors and the blower, according to some alternative embodiments of the present disclosure.
Figure 5:
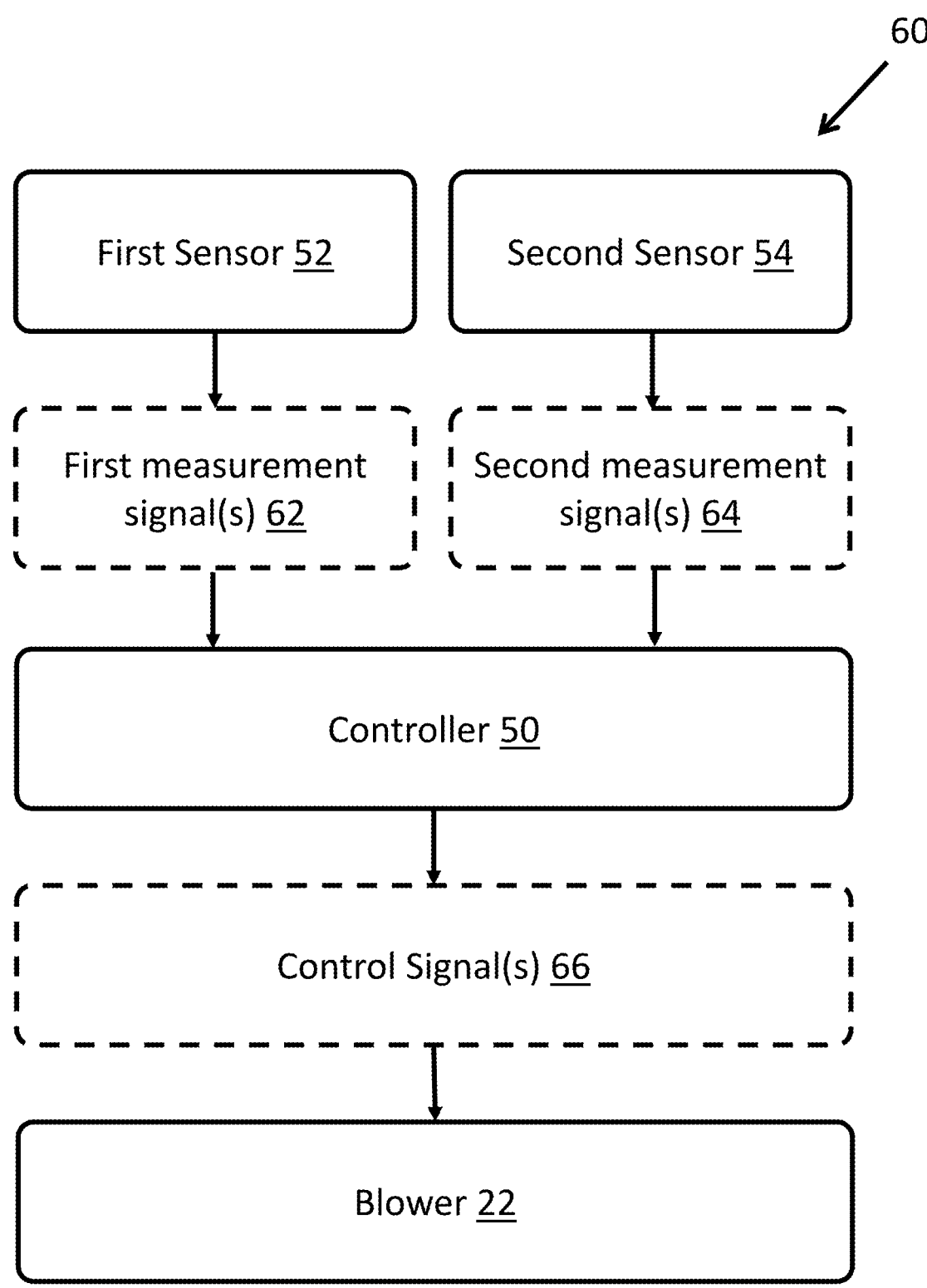
FIG. 5 is a schematic view of signal transmissions for the apparatus of FIG. 3, depicting the transmission of measurement signals from the sensors to the controller, and the transmission of a control signal from the controller to the blower, according to some embodiments of the present disclosure.
Figure 7:
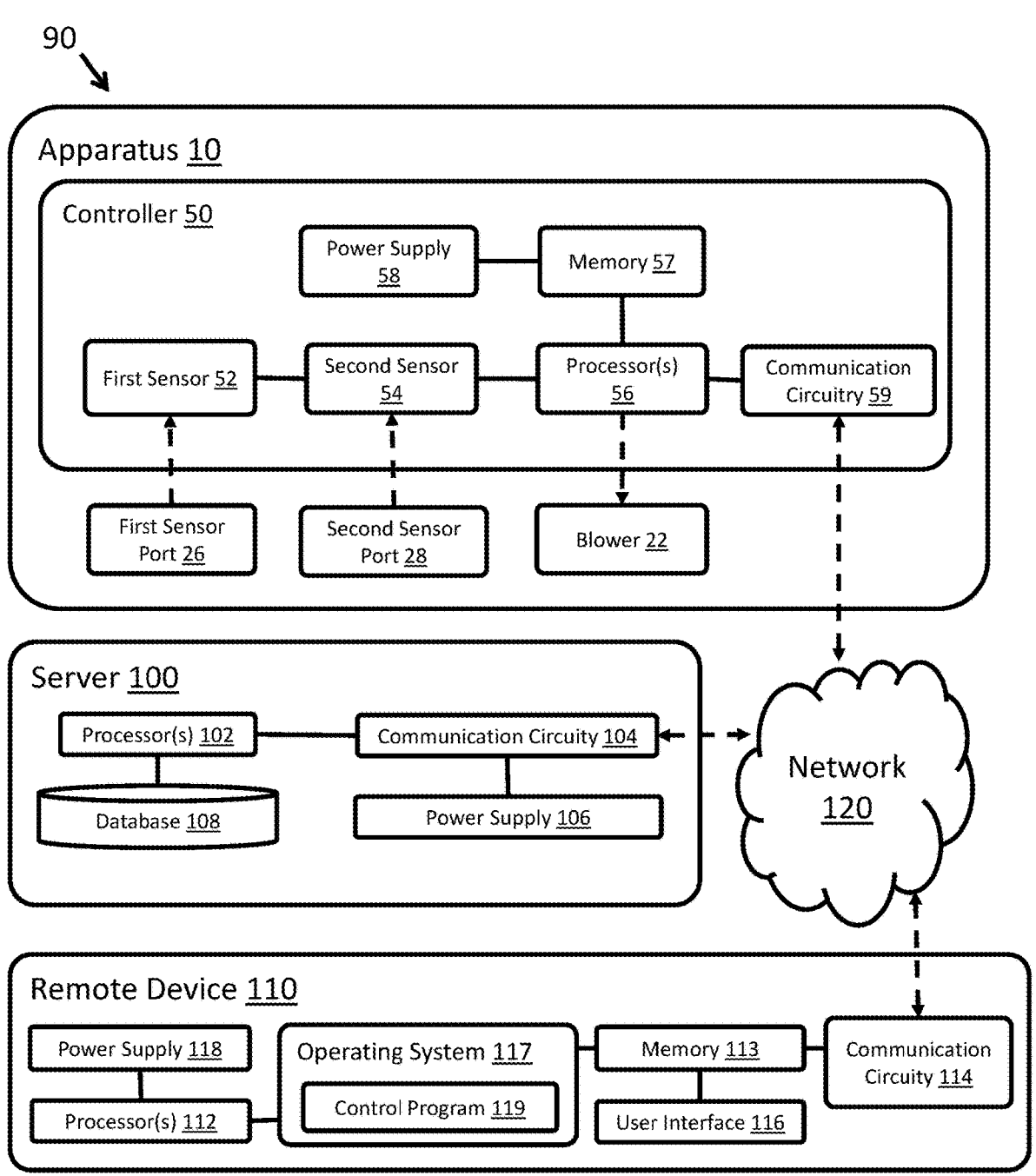
FIG. 7 is a schematic view of a system for draining an air moisture separator, including the apparatus of FIG. 3, a remote device, and a server, according to some embodiments of the present disclosure.

Referring now to FIGS. 3-5, the apparatus 10 may further include a controller 50, according to some embodiments of the present disclosure. The controller 50 may be operable to receive measurement signals from the first and/or second sensors 52, 54. Based on the received measurement signals, the controller 50 may be configured to make one or more determinations and, in response to such determinations, provide one or more control signals to the blower 22 in order to selectively operate the blower 22 as discussed above. For example, FIG. 5 depicts a flow 60 of signals pertaining to operation of the apparatus 10. The first sensor 52 may provide first measurement signal(s) 62 to the controller 50, while the second sensor 54 may provide second measurement signal(s) 64 to the controller 50. Based on the first and second measurement signal(s) 62, 64, the controller 50 may provide control signal(s) 66 to the blower 22. As discussed in greater detail below with reference to FIG. 7, the controller 50 may include one or more processors 56 that are configured to facilitate receiving the measurement signals 62, 64, interpreting the measurement signals 62, 64, and providing the control signal(s) 66 to the blower 22 in accordance with the measurement signals 62, 64, among other tasks.

In some embodiments, the controller 50 is connected to the first and/or second sensors 52, 54 via a wired connection. In other embodiments, the controller 50 is connected to the first and/or second sensors 52, 54 via a wireless (e.g., remote) connection. In other embodiments still, and as depicted with particular reference to FIG. 4, the controller 50 may be formed with the first and/or second sensors 52, 54 as a single unit. For example, a first tube 27 may connect the first port 26 to the first sensor 52, while a second tube 29 may connect the second port 28 to the second sensor 54, and the first and/or second sensors 52, 54 may be located with the controller 50 as an external unit with respect to the other various components of the apparatus 10.

Figure 6:
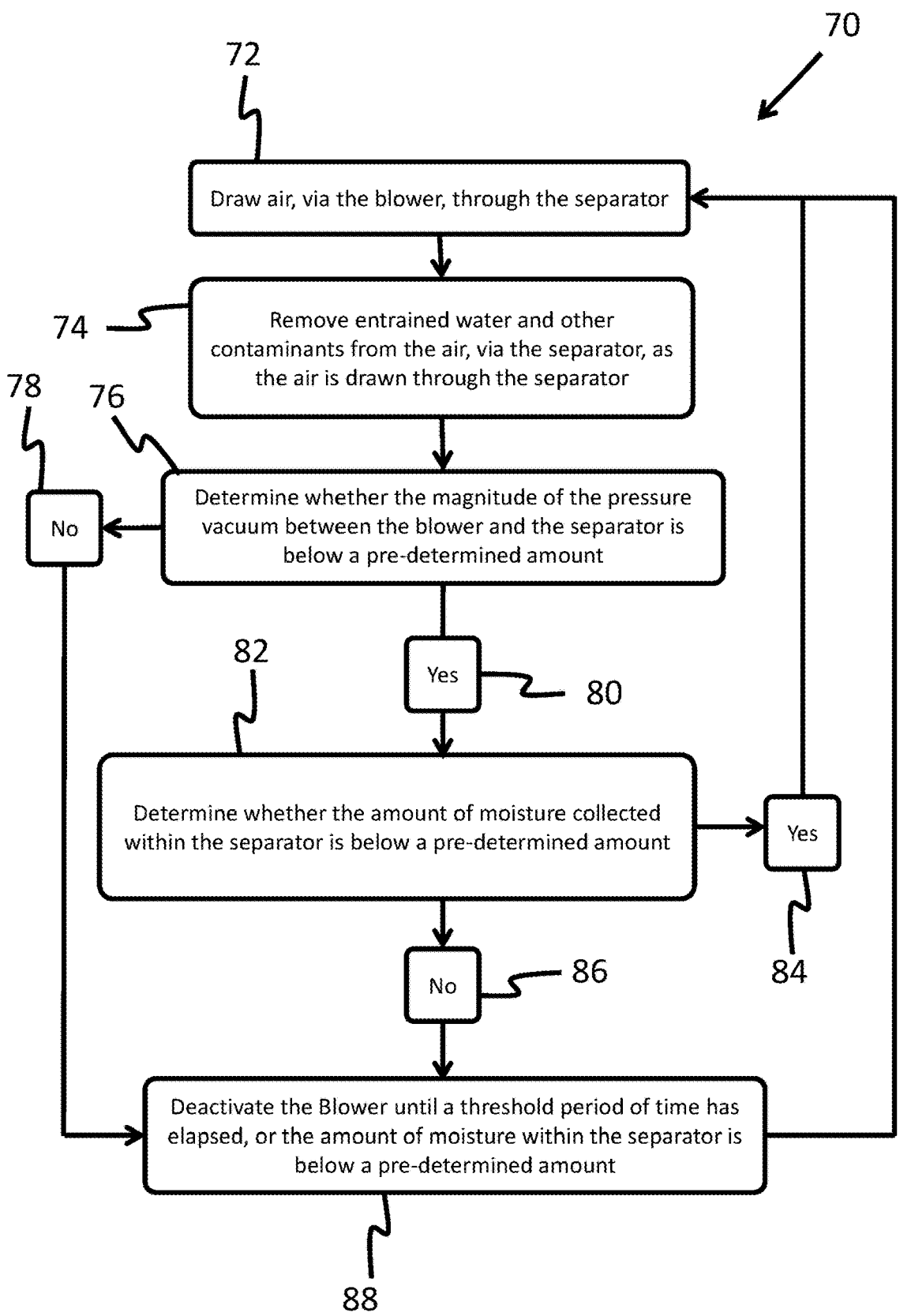
FIG. 6 is a schematic view of a method of operating the apparatus of FIG. 3, according to some embodiments of the present disclosure.

Referring now to FIG. 6, a method 70 of operating the apparatus 10 is shown, according to some embodiments of the present disclosure. In a first step 72 of the method 70, the blower 22 may be activated, as discussed above. In other words, the blower 22 may apply a pressure vacuum (e.g., a negative pressure) to the outlet opening 36 of the separator 12, such that moisturized air is drawn through the separator 12. Accordingly, at a step 74 of the method 70, moisture may be removed from the moisturized air by the separator 12 and collected within the separator 12. In a step 74 of the method 70, the second sensor 54 may be used to determine whether the magnitude of the pressure vacuum between the separator 12 and the blower 22 is below a threshold minimum value or, in other words, a pre-determined amount (e.g., whether or not the blower 22 is "choked"). If the pressure vacuum between the separator 12 and the blower 22 is below the pre-determined amount, the method 70 may follow a "yes" determination 80 and proceed to a step 82 of the method 70. If the pressure vacuum between the separator 12 on the blower 22 is above the pre-determined amount, the method 70 may follow a "no" determination 78 and deactivate the blower 22.

In the step 82 of the method 70, the first and second sensors 52, 54 may be used to determine whether the difference between the pressure within the separator 12 (e.g., the pressure on the valve 30) and the pressure between the separator 12 and the blower 22 is below a threshold maximum value or, in other words, another pre-determined amount. As discussed above, this difference may be indicative of whether the amount of moisture collected within the separator 12 is below a pre-determined amount. The greater the difference, the greater amount of moisture that is present within the separator 12. If the amount of moisture collected within the separator 12 is below the pre-determined amount, the method 70 may follow a "yes" determination 84 and return to the step 72 of the method 70, such that the blower 22 continues to be operated in the activated state. If the amount of moisture collected within the separator 12 is above the pre-determined amount, the method 70 may follow a "no" determination 86 and proceed to the step 88 of the method 70, where the blower 22 is deactivated. The blower 22 may be deactivated until another determination is made. In some embodiments, this determination is that a threshold period of time has elapsed since the blower 22 was deactivated. In other embodiments, this determination is that the moisture collected within the separator 12 has returned to a pre-determined amount Referring to FIG. 7, a system 90 for operating the apparatus 10 is shown, according to some embodiments of the present disclosure. The system 90 may include the apparatus 10 (and the controller 50 therein), a server 100, and a remote device 110. As depicted, the controller 50 may include the first and second sensors 52, 54. Of course, as discussed above, the controller 50 may be separate from the first and second sensors 52, 54, which may be configured to transmit the measurement signals 62, 64 (respectively) to the controller 50. As described in greater detail below, the controller 50 of the apparatus 10 may communicate with the server 100 and the remote device 110 over a network 120. As examples, the network 120 may be a local area network ("LAN"), a wide area network ("WAN"), a point-to-point network, and so on.

Depending on the implementation of the present disclosure, the remote device 110 may be a desktop computer, a laptop computer, a tablet computer, a wireless device such as a mobile phone or a smart phone, a smartwatch, a gaming console, an application server, a database server, or some other type of computing device. The remote device 110 may include a physical computing device or may include a virtual machine executing on another computing device. In conjunction with the controller 50 and/or the server 100, the remote device 110 may form a cloud computing system, a distributed computing system, or another type of multi-device system.

In some embodiments, the controller 50 includes the first and second sensors 52, 54, along with the processor(s) 56, as discussed above. The controller 50 may further include a memory 57, a power supply 58, as well as communication circuitry 59. The server 100 may include one or more processors 102, communication circuitry 104, a power supply 106, and a database 108. The user mobile device may include one or more processors 112, a memory 113, communication circuitry 114, a user interface 116, and an operating system 117, which may include a control program 119.

In some embodiments, the power supply 58 is a permanent component within the apparatus 10 (or, simply within the controller 50 therein), provides power to the other components of the apparatus 10, and may be recharged with an external power source. In other words, the power supply 58 may be a permanent battery. In other embodiments, the power supply 58 may be a separate component that is configured to be engaged and/or disengaged from the other components of the apparatus 10, such that the power supply 58 is replaceable. In other words, the power supply 58 may be a replaceable battery. In other embodiments still, the power supply 58 may be provided as an external power source that is engaged (e.g., plugged in) with the other components of the apparatus 10. In other words, the controller 50 may be operated by plugging a power chord into a power port located on controller 50. Depending on the implementation, the power supply 106 of the server 100 may be configured similar to the power supply 58, as applied to the function of the server 100. Similarly, the power supply 118 of the remote device 110 may be configured similar to the power supply 58, as applied to the function of the remote device 110.

In some embodiments, the processor(s) 56 include any suitable processing circuitry capable of controlling operations of one or more components of the controller 50 (e.g., the first and second sensors 52, 54, the blower 22, etc.). In some embodiments, the processor(s) 56 facilitate communications between various components within the apparatus 10. For example, the processor(s) 56 may receive outputs from the first and/or second measurement signals 62, 64 from the first and/or second sensors 52, 54 (respectively), interpret the first and/or second measurement signals 62, 64, and convey the control signal 66 to the blower 22 based on the first and/or second measurement signals 62, 64. The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

In some embodiments, the processor(s) 56 includes a computer-readable storage medium (or media) having computer-readable program instructions thereon for causing the processor(s) 56 to carry out aspects of the present disclosure, such as providing the control signal 66 to the blower 22. Depending on the implementation, the processor(s) 102 of the server 100 may be configured similar to the power supply processor(s) 52, as applied to the function of the server 100. Similarly, the processor(s) 112 of the remote device 110 may be configured similar to the processor(s) 56, as applied to the function of the remote device 110.

In some embodiments, the communications circuitries 59, 104, and 114 of the controller 50, the sever 100, and the remote device 110 (respectively) each include any circuitry capable of connecting the apparatus 10, the server 100, and the remote device 110 with one or more external devices, including each other. Accordingly, the communication circuitries 59, 104, and 114 may include any circuitry capable of connecting the apparatus 10, the server 100, and the remote device 110 (respectively) to the network 120 and with each other over the network 120. The communication circuitries 59, 104, and 114 may support any suitable communications protocol including, but not limited to, Wi-Fi (e.g., 802.11 protocol), Bluetooth®, radio frequency systems (e.g., 900 MHz, 1.4 GHz, and 5.6 GHz communications systems), infrared, GSM, GSM plus EDGE, CDMA, quadband, VOIP, or any other communications protocol, or any combination thereof. Thus, one or more of the communications circuitries 59, 104, and 114 may be configured for a wireless connection, as shown. In other embodiments, one or more of the communications circuitries 59, 104, and 114 are configured for a wired connection.

In some embodiments, the memories 57 and 113 of the apparatus 10 and the remote device 110 (respectively) may each store various data structures and/or modules in order to perform the systems and methods described herein. Similarly, the database 108 of the server 100 may include one or more data structures for performing the systems and methods described herein. For example, the memories 57 and 113, as well as the database 108, may include any suitable form of memory such as cache memory, non-transitory memory (e.g., semi-permanent memory, RAM, etc.), or any other memory type, or any combination thereof. In some embodiments, the memory 57, the memory 113, and/or the database 108 are used in place of and/or in addition to an external memory source or storage unit or device for storing data. The memories 57 and 113, as well as the database 108, may also include one or more storage mediums including, but not limited to, hard drives, solid state drives, flash memory, permanent memory (e.g., ROM), or any other storage type or any combination thereof.

In order for the system 90 to function in accordance with the methods described herein, the remote device 110 may receive stored data from the controller 50 and/or the server 100. Pursuant to such systems and methods, the remote device 100 may store, at least temporarily, such received data in the memory 113. In some embodiments, the memory 113 of the remote device 110 stores data regarding the apparatus 10 and/or the operating system 117, which includes the control program 119. As described in greater detail below, the control program 119 may (via the user interface 116) present, for display, one or more indications (e.g., graphical user interfaces ("GUI(s)")) and perform operations relating the systems and methods described herein.

Figure 8:
FIG. 8 is an exemplary depiction of an indication presented for display by the remote device of FIG. 7, according to some embodiments of the present disclosure.
Figure 9:
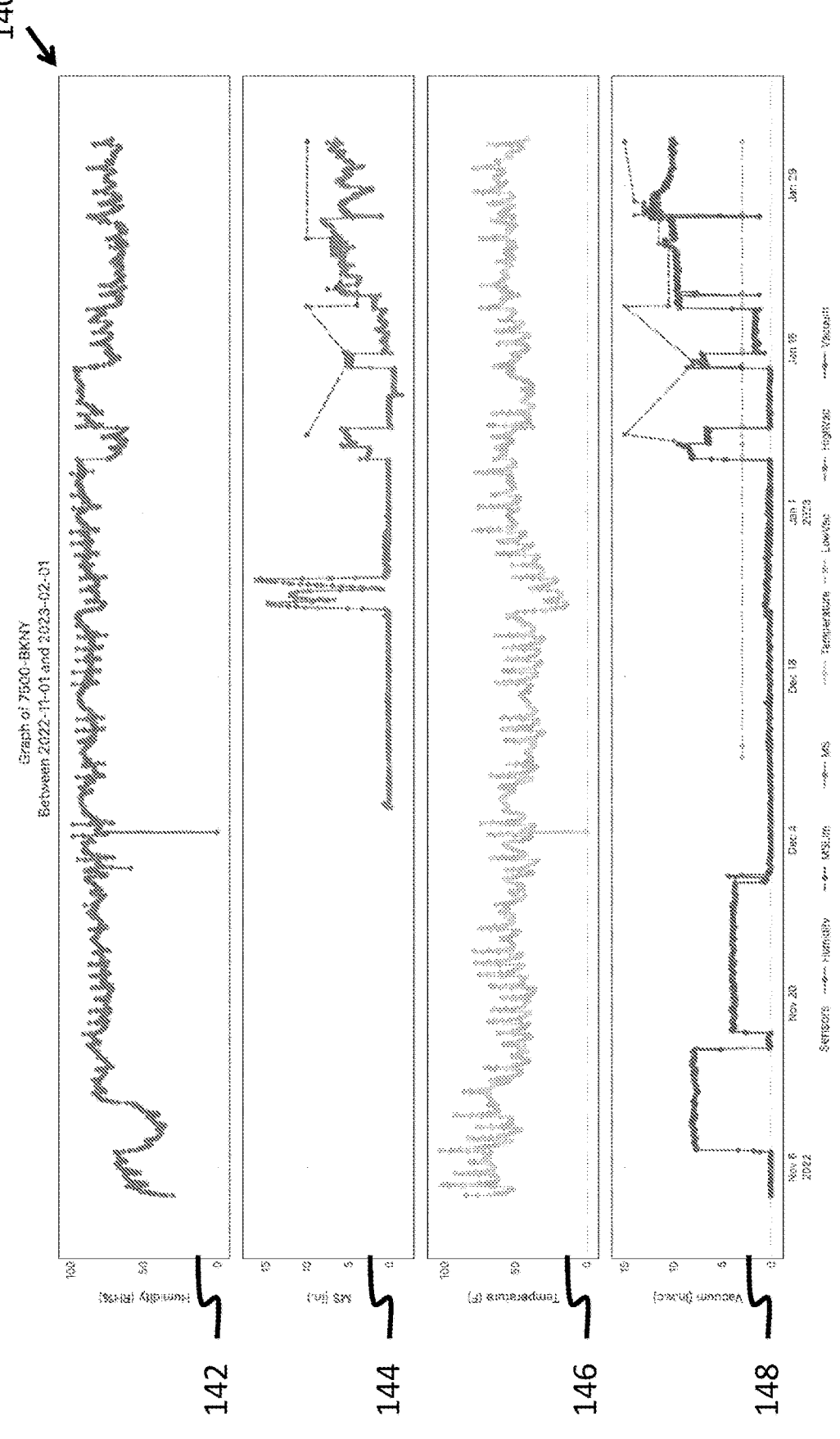
FIG. 9 is an exemplary depiction of an indication presented for display by the remote device of FIG. 7, according to some embodiments of the present disclosure.
Figure 10:
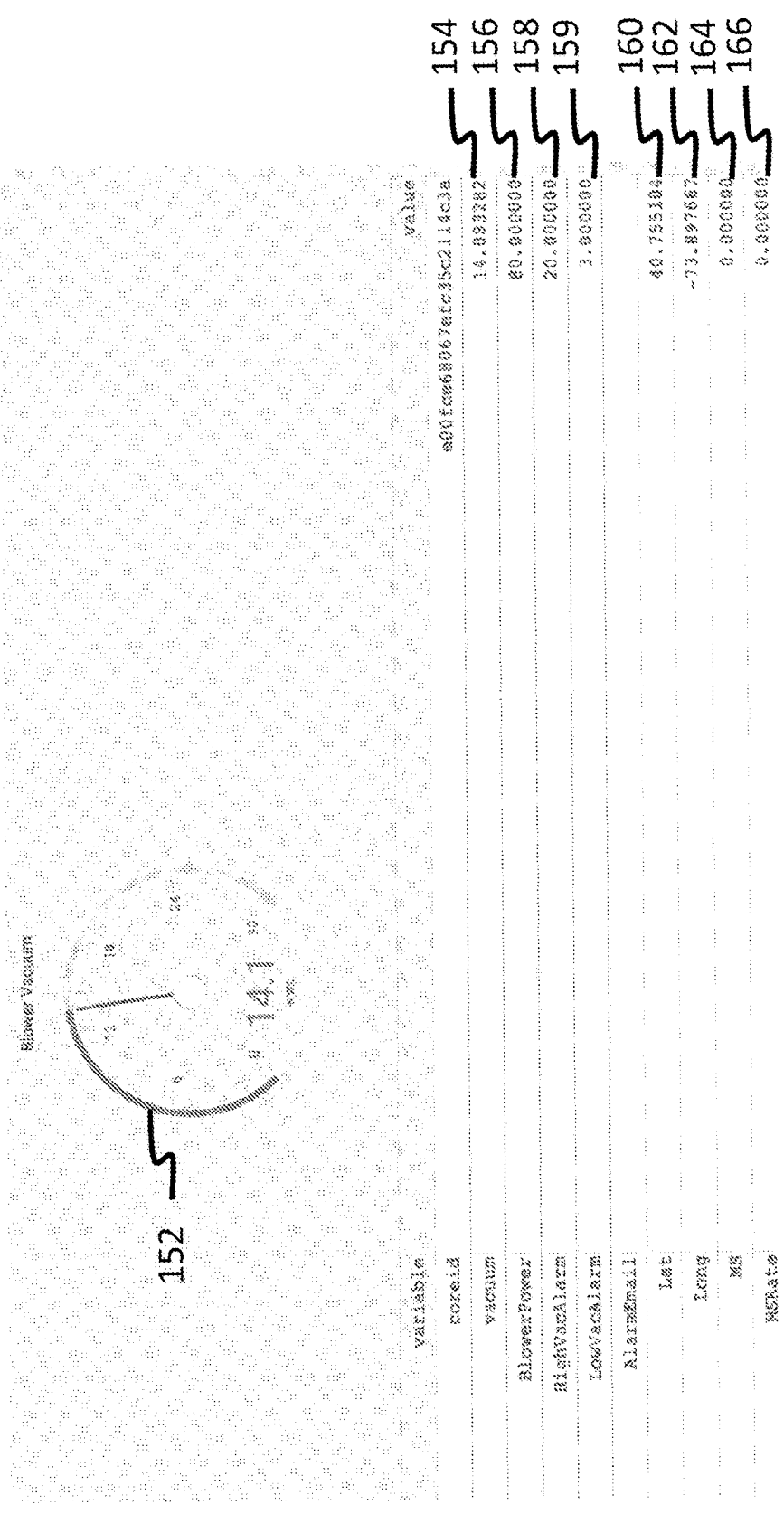
FIG. 10 is an exemplary depiction of an indication presented for display by the remote device of FIG. 7, according to some embodiments of the present disclosure.

Referring now to FIGS. 8-10, one or more indications presented for display by the remote device 110 are shown, according to various embodiments of the present disclosure. As a first example, the controller 50 may be configured to transmit a first status signal to the remote device 110. The first status signal may indicate whether the blower 22 has been activated or deactivated. Accordingly, as depicted with particular reference to FIGS. 8 and 10, the remote device 110 may be configured to present, for display, a first indication via a GUI 130 or a GUI 150 based on the first status signal, such as an indication 132 or an indication 164, which may indicate that the blower 22 has been deactivated, or an indication 134, which may indicate that the blower 22 has been activated (e.g., is currently operating in an active state). In some embodiments, multiple controllers associated with multiple apparatus may simultaneously transmit such status signals to the remote device 110. In order for the remote device 110 to differentiate between such controllers, each controller may further transmit location data to the remote device 110. Accordingly, and as depicted with reference to FIG. 8, the remote device 110 may be configured to present, for display, a map organizing each first indication with respect to a location of each apparatus associated with the remote device 110. Further, and depicted with reference to FIG. 10, the remote device 110 may be configured to present, for display, the location data of a single apparatus via indications 160 and 162.

As a second example, the controller 50 may be configured to transmit a second status signal to the remote device 110. The second status signal may indicate the amount of moisture collected within the separator 12 (which may be determined as discussed above). Accordingly, as depicted with particular reference to FIGS. 9-10, the remote device 110 may be configured to generate, for display, a second indication via a GUI 140 or a GUI 150, such as an indication 144 or an indication 164. As shown, the indication 144 charts the amount of moisture within the separator 12 over a period of time. In other words, the remote device 110 may receive repeated second status signals, such that they may be presented relative to one another over a period of time. Additionally, and as depicted with reference to FIG. 10, the remote device 110 may be configured to convert such repeated second status signals into a rate at which the amount of moisture within the separator 12 is changing over time, and present such data via an indication 166. As suggested above, the amount of moisture within the separator 12 may be converted from a measurement, detected by the first and second sensors 52, 54, regarding the difference between the pressure within the separator 12 (or, more particularly, the pressure on the valve 30) and the pressure between the separator 12 and the blower 22.

As a third example, the controller 50 may be configured to transmit a third status signal to the remote device 110. The third status signal may indicate the pressure between the separator 12 and the blower 22 (e.g., the pressure vacuum generated by the blower 22). Accordingly, as depicted with particular reference to FIGS. 9-10, the remote device 110 may be configured to generate, for display, a third indication via the GUI 140 or the GUI 150, such as an indication 148, an indication 152, and/or an indication 154. As shown, the indication 148 charts the vacuum generated by the blower 22 over time. As discussed above, the apparatus 10 may include additional sensors that may measure conditions such as humidity and temperature. Accordingly, such additional sensors may also transmit humidity measurement signals to the remote device 110, which may present such humidity signals as an indication 142. Further, such additional sensors may also transmit temperature data to the remote device 110, which may present such temperature signals as an indication 146.

As depicted with particular reference to FIG. 10, the remote device 110 may receive additional transmissions regarding additional data from the controller 50, and present such data. For example, the remote device 110 may receive status signals indicating the power that the blower 22 drawing for operation, and present an indication 156 in accordance with such a status signal, as well as a pressure range at which the apparatus 10 is configured to activate or deactivate the blower 22, which may be presented via indications 158 and 159.

As suggested above, the remote device 110 may be configured, for display, indications representing status signals over a period of time. Accordingly, in some embodiments, the remote device 110 stores each received status signal as it is received from the controller 50, organizes such status signals by time, and is thus configured to present such charts of the status signals over a period of time. In further embodiments, the controller 50 transmits (either in addition to the remote device 110, or instead of the remote device 110) such status signals to the server 100, which may store such status signals in the database 108, which may be configured to organize status signals by time, and by which controller (and thus, which apparatus) the status signals were received from. In turn, the remote device 110 may be configured to transmit a status request to the server 110, which the server may respond to by transmitting the stored status signals, such that the remote device 110 may receive a number of status signals over time, regarding a number of apparatuses. In turn, the remote device 110 may present, for display, such accumulated status signals as depicted herein.

In some embodiments, the remote device 110 may be operated to update the configuration of the apparatus 10. As an example, the remote device 110 may allow for one or more user inputs updating the pressure range that determines whether the blower 22 must be activated or deactivated. Accordingly, the remote device 110 may be configured to receive user inputs updating the indications 158 and 159, and transmit the user inputs to the controller 50, such that the controller 50 updates the selective operation of the blower 22 accordingly. As another example, the remote device 110 may allow for one or more user inputs updating the power that the blower 22 draws. Accordingly, the remote device 110 may be configured to receive user inputs updating the indication 156, and transmit the user inputs to the controller 50, such that the controller 50 updates the power drawn by the blower 22, and thus the vacuum generated by the blower 22.

Figure 11:
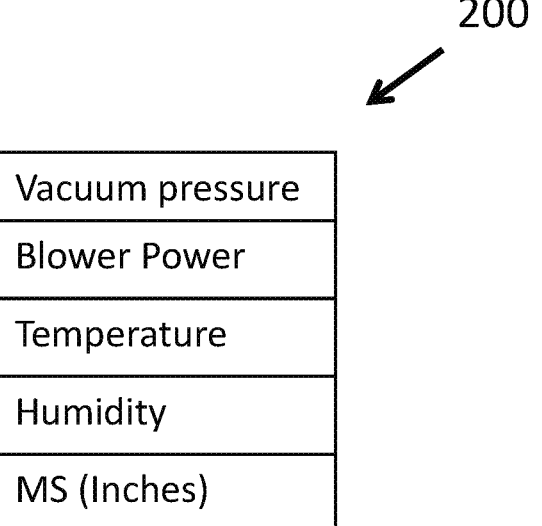
FIG. 11 is a schematic view of a data packet, according to some embodiments of the present disclosure.

Referring to FIG. 11, a data packet 200 is shown, according to some embodiments of the present disclosure. The data packet 200 may be transmitted among the various components of the system 90 in order to perform the methods described herein. For example, the data packet 200 may be transmitted from the controller 50 to the remote device 110, from the controller 50 to the server 100, from the server 100 to the remote device 110, from the remote device 110 to the controller 50, and so on. As shown, the data packet 200 may include any of the information associated with the various measurement signals, status signals, or control signals discussed above.

Figure 12:
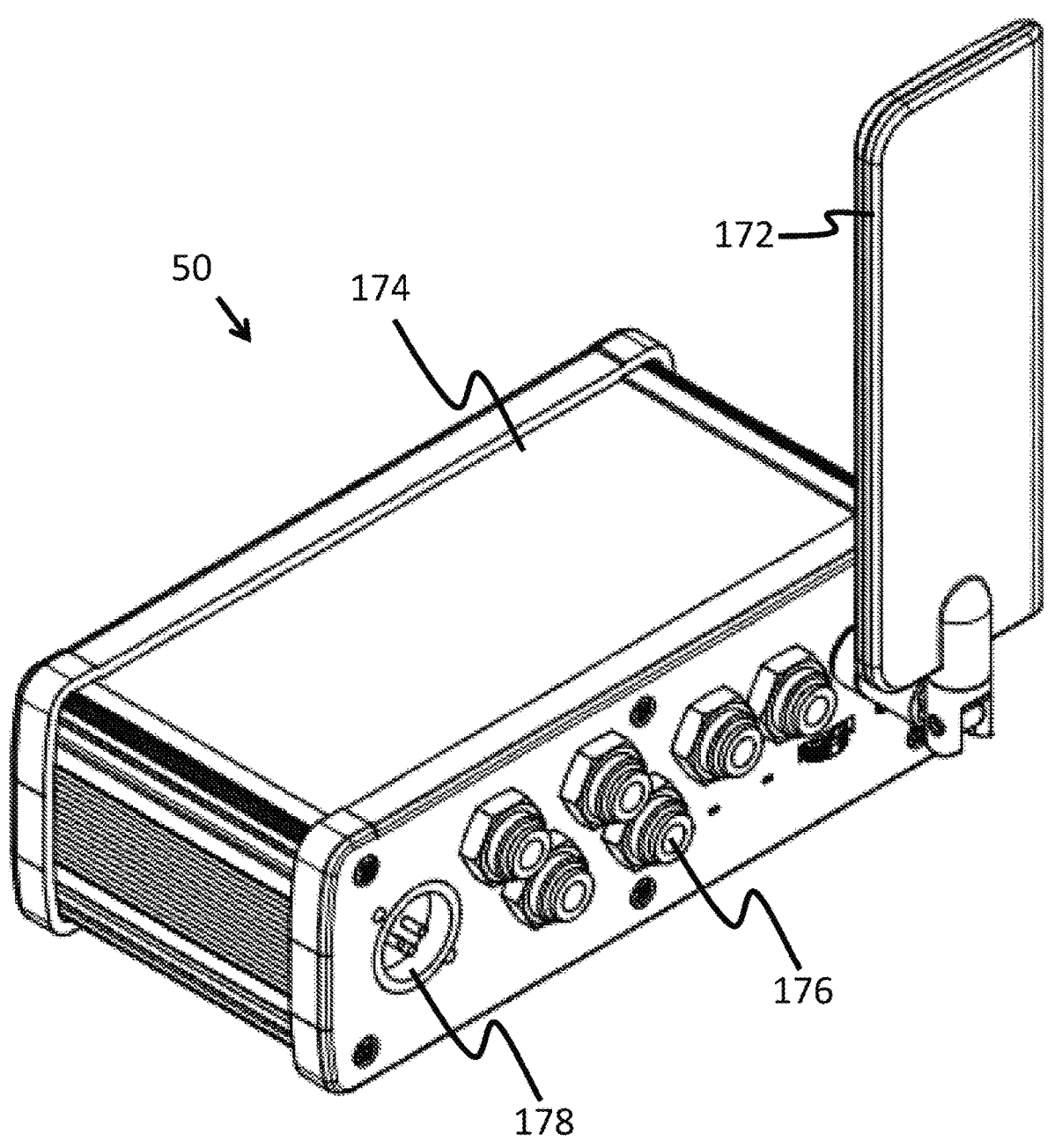
FIG. 12 is a perspective view of the controller of the apparatus of FIG. 2, according to some embodiments of the present disclosure.
Figure 13:
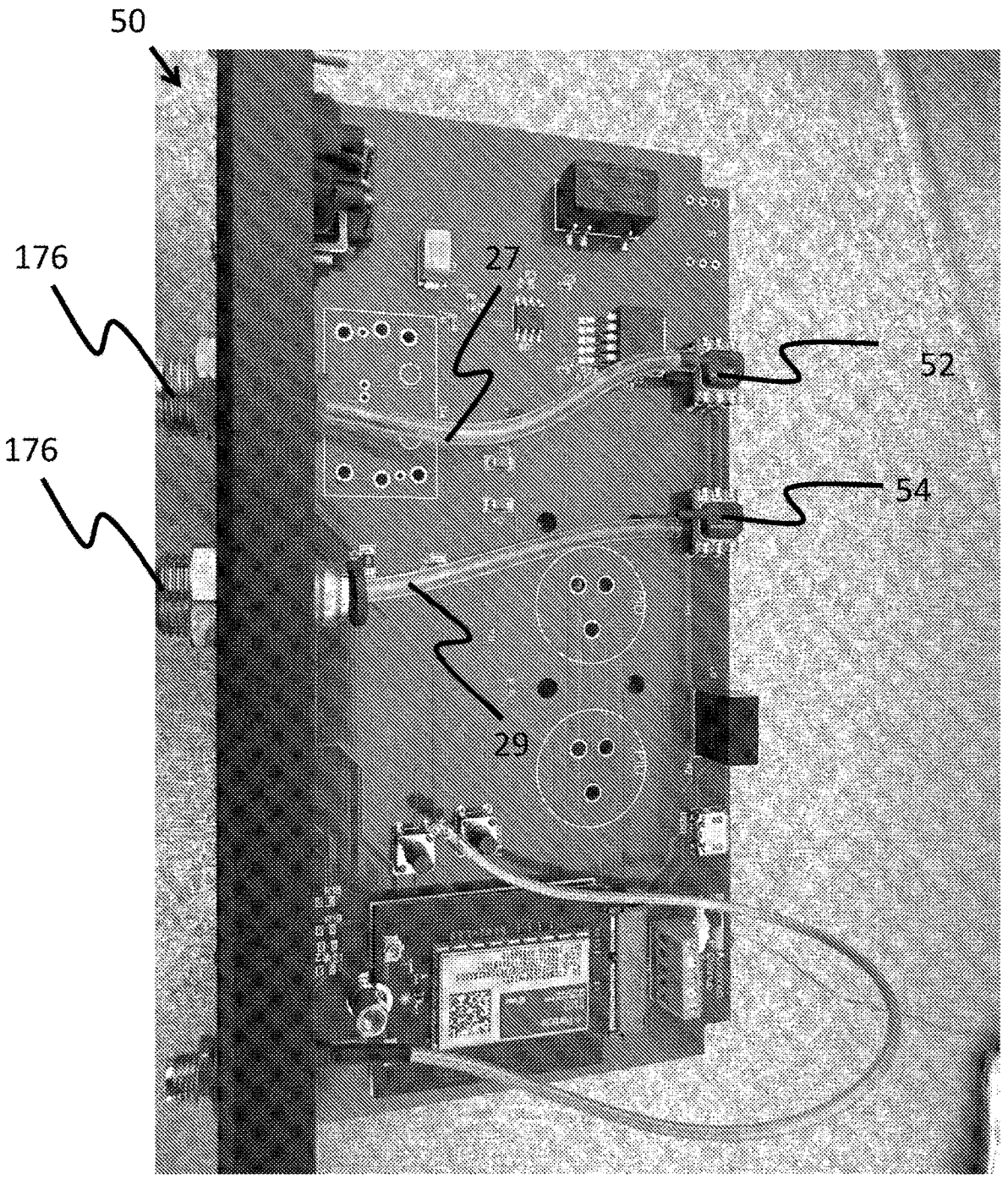
FIG. 13 is an interior view of the controller of the apparatus of FIG. 4, according to some embodiments of the present disclosure.
Figure 14:
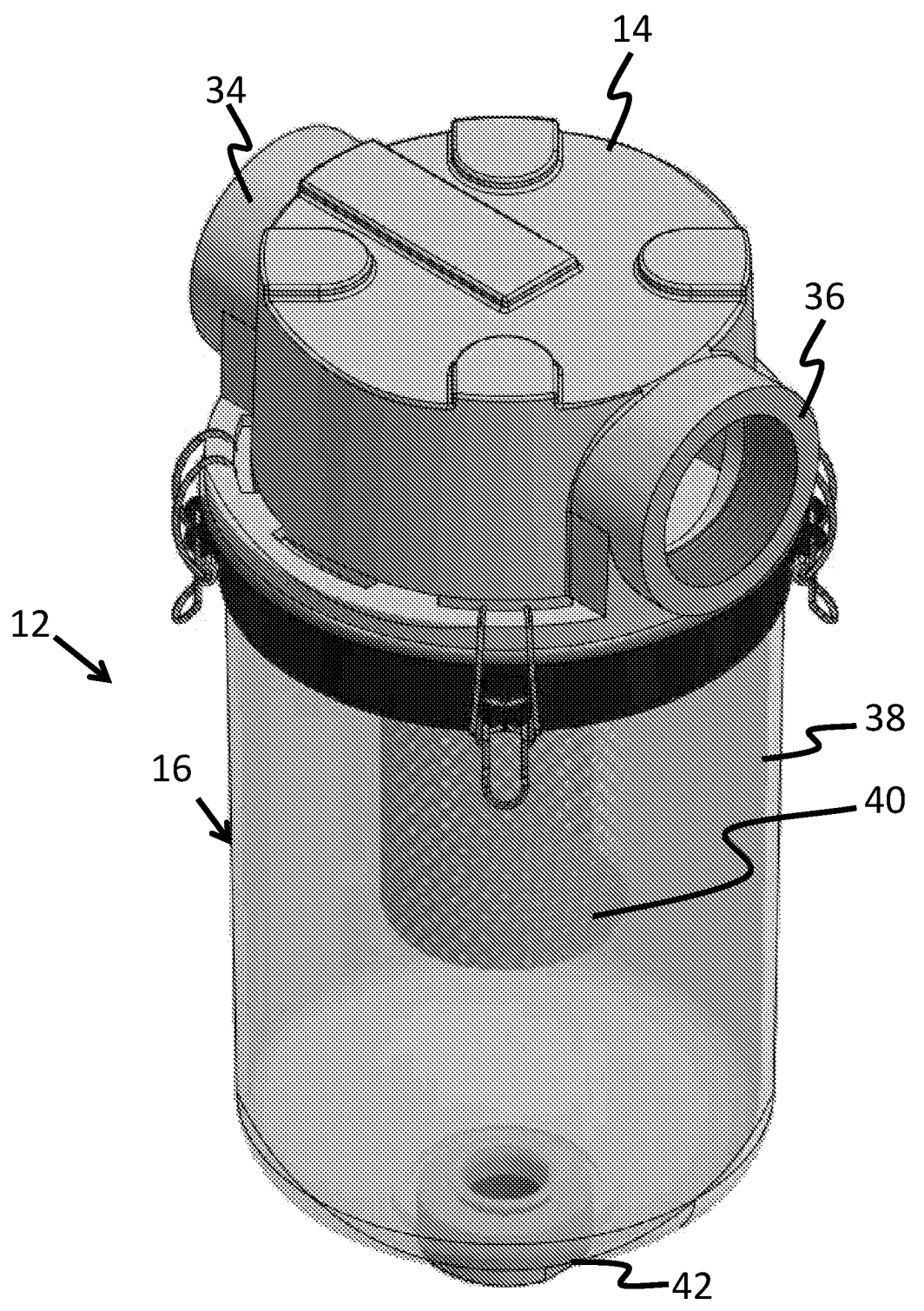
FIG. 14 is a perspective view of an air moisture separator, according to some embodiments of the present disclosure.

Referring to FIGS. 12-13, the controller 50 is shown in greater detail, according to some embodiments of the present disclosure. In addition to the components discussed above, the controller 50 may include a housing 174, an antenna 172, one or more measurement inputs 176, and one or more control outputs 178. The antenna 172 may facilitate transmission of wireless communications as discussed herein. The one or more measurement inputs 176 may be configured to receive the measurements detected by sensors such as the first and second sensors 52, 54 (in cases where such sensors are directly connected to the controller 50). The one or more control outputs 178 may be configured to transmit control signals to the blower 178 (in cases where the blower 22 is directly connected to the controller 50). Additionally, the one or more control outputs may be configured to provide power to the blower 22. As shown with particular reference to FIG. 13, the first and second sensors 52, 54 may be included within the controller 50, as discussed above with reference to FIG. 4.

Thus, although there have been described particular embodiments of the present invention of a new and useful APPARATUSES, SYSTEMS AND METHODS FOR DRAINING AN AIR MOISTURE SEPARATOR it is not intended that such references be construed as limitations upon the scope of this invention.

What is claimed is:

1. An apparatus for draining an air moisture separator, the apparatus comprising:

a blower fluidly coupled to the air moisture separator and configured to draw air through the air moisture separator when the blower is activated, such that moisture is separated from the air and collected within the air moisture separator;

a valve connected to the air moisture separator, wherein the valve permits the moisture to exit the air moisture separator based on an amount of moisture collected within the air moisture separator;

one or more sensors; and a controller that deactivates the blower based on a first determination and activates the blower following deactivation of the blower based on a second determination, wherein the first determination is based on a first measurement detected by the one or more sensors, and wherein the valve is a check valve that permits the moisture to exit the air moisture separator when a threshold amount of pressure is applied to the valve by the moisture collected within the air moisture separator.

2. The apparatus of claim 1, wherein the first determination is that a first pre-determined amount of moisture is collected within the air moisture separator.

3. The apparatus of claim 2, wherein the second determination is one of: that a pre-determined period of time has elapsed since the controller deactivated the blower, or that a second pre-determined amount of moisture is collected within the air moisture separator that is less than the first pre-determined amount, and wherein the second determination is based on a second measurement detected by the one or more sensors.

4. The apparatus of claim 2, wherein the one or more sensors includes one or more pressure sensors.

5. The apparatus of claim 4, wherein the first measurement is a difference between a first pressure within the air moisture separator and a second pressure between the moisture separator and the blower.

6. The apparatus of claim 5, wherein the controller is further configured to deactivate the blower based on a third determination that a magnitude of a pressure vacuum between the blower and the air moisture separator is above a threshold value, wherein the third determination is based on a third measurement, and wherein the third measurement is the pressure between the moisture separator and the blower.

7. The apparatus of claim 2, wherein the one or more sensors includes a high voltage switch and a fluid float.

8. An apparatus for draining an air moisture separator, the apparatus comprising:

a blower fluidly coupled to the air moisture separator and configured to draw air through the air moisture separator when the blower is activated, such that moisture is separated from the air and collected within the air moisture separator;

a valve connected to the air moisture separator, wherein the valve permits the moisture to exit the air moisture separator based on an amount of moisture collected within the air moisture separator;

one or more sensors; and a controller that deactivates the blower based on a first determination and activates the blower following deactivation of the blower based on a second determination, wherein the first determination is based on a first measurement detected by the one or more sensors, and wherein the first determination is that a first pre-determined amount of moisture is collected within the air moisture separator.

9. The apparatus of claim 8, wherein the one or more sensors includes one or more pressure sensors.

10. The apparatus of claim 8, wherein the one or more sensors includes a high voltage switch and a fluid float.

11. An apparatus for draining an air moisture separator, the apparatus comprising:

a blower fluidly coupled to the air moisture separator and configured to draw air through the air moisture separator when the blower is activated, such that moisture is separated from the air and collected within the air moisture separator;

a valve connected to the air moisture separator, wherein the valve permits the moisture to exit the air moisture separator based on an amount of moisture collected within the air moisture separator;

one or more sensors; and a controller that deactivates the blower based on a first determination and activates the blower following deactivation of the blower based on a second determination, wherein the first determination is based on a first measurement detected by the one or more sensors, and wherein the first determination is that a rate at which the amount of moisture collected within the air moisture separator is changing over time has eclipsed a predetermined threshold.

12. The apparatus of claim 11, wherein the valve is a check valve that permits the moisture to exit the air moisture separator when a threshold amount of pressure is applied to the valve by the moisture collected within the air moisture separator.

13. The apparatus of claim 12, wherein the one or more sensors includes one or more pressure sensors.

14. The apparatus of claim 12, wherein the one or more sensors includes a high voltage switch and a fluid float.

* * * * *